(12) United States Patent  
Matuschek et al.

(10) Patent No.: US 9,079,552 B2
(45) Date of Patent: Jul. 14, 2015

(54) MOTOR VEHICLE WITH CRASHBOX

(71) Applicant: GM GLOBAL TECHNOLOGY OPERATIONS LLC, Detroit, MI (US)

(72) Inventors: Jens Matuschek, Reusselsheim (DE); Roland Schirmer, Frankfurt (DE); Uwe Eckert, Bischofsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 13/671,784

(22) Filed: Nov. 8, 2012

(65) Prior Publication Data

US 2013/0119682 A1 May 16, 2013

(30) Foreign Application Priority Data

Nov. 11, 2011 (DE) .......................... 10 2011 118 327

(51) Int. Cl.
*B60R 19/34* (2006.01)

(52) U.S. Cl.
CPC ....................... *B60R 19/34* (2013.01)

(58) Field of Classification Search
CPC ....................................................... B60R 19/34
USPC ................................................. 293/133, 155
See application file for complete search history.

(56) References Cited

U.S. PATENT DOCUMENTS

| 5,785,367 | A | 7/1998 | Baumann et al. |
| 6,830,286 | B2 | 12/2004 | Bechtold et al. |
| 7,494,167 | B2 | 2/2009 | Braunbeck et al. |
| 7,810,868 | B2 * | 10/2010 | Braunbeck et al. ...... 296/187.03 |
| 8,246,092 | B2 | 8/2012 | Frank |
| 8,287,031 | B2 | 10/2012 | Braunbeck et al. |
| 2010/0019518 | A1 | 1/2010 | Stewart et al. |

FOREIGN PATENT DOCUMENTS

| DE | 10359483 A1 | 7/2005 |
| DE | 102006019653 A1 | 11/2006 |
| DE | 102008035448 A1 | 3/2009 |
| DE | 102008032543 A1 | 4/2009 |
| EP | 1398224 A1 | 3/2004 |
| EP | 1829753 A1 | 9/2007 |
| WO | 2008093244 A2 | 8/2008 |

OTHER PUBLICATIONS

German Patent Office, German Search Report for Application No. 102011118327.6, dated Jul. 19, 2012.

* cited by examiner

*Primary Examiner* — Dennis H Pedder

(74) *Attorney, Agent, or Firm* — Ingrassia Fisher & Lorenz PC

(57) ABSTRACT

A motor vehicle, in particular passenger motorcar, is provided. The motor vehicle includes a side member, a bumper and a crashbox. The crash box includes a main portion extending between a tip of the side member and the bumper and an anchoring portion pushed into an open end of the side member. A support body extends within the anchoring portion between walls of the anchoring portion located opposite each other.

15 Claims, 2 Drawing Sheets

MOTOR VEHICLE WITH CRASHBOX

CROSS-REFERENCE TO RELATED APPLICATION

This application claims priority to German Patent Application No. 10 2011 118 327.6, filed Nov. 11, 2011, which is incorporated herein by reference in its entirety.

TECHNICAL FIELD

The present disclosure relates to a motor vehicle, in particular a passenger car, with at least one side member, a bumper and a crashbox, which comprises a main portion extending between a tip of the side member and the bumper and an anchoring portion pushed into an open end of the side member. Such a crashbox is to dissipate impact energy through deformation in the case of an impact event and because of this help avoid a deformation of the side member that can only be rectified again under great difficulties.

BACKGROUND

From US 2010/0019518 A1 a crashbox with main portion and anchoring portion is known, wherein the anchoring portion is slightly tapered relative to the main portion, so that a shoulder which connects the two portions, supports itself on the front edge of the side member in the event of a collision. In order to prevent that the shoulder slides off the front edge of the side member and the main portion of the crashbox also enters the side member, the latter is stiffened through a support body. This support body is substantially formed through a plate extending in the main portion at a small distance from the shoulder and filling out the cross section of the crashbox as well as a plurality of flanges angled-off the plate and jointly screwed to the walls of the anchoring portion on insides of the side member. In that these flanges cross the plane of the shoulder and are fixed on a side of this plane through the plate and on the other one through the screwing to the side member, they can prevent an inwardly directed deformation of the main portion of the crashbox.

The anchoring portion of this conventional crashbox in cross section transversely to the longitudinal axis of the crashbox substantially has the shape of a rectangle with continuous walls and rounded-off corners. The cross section of the anchoring portion has to be very precisely matched to the cross section of the side member since an oversize of the anchoring portion prevents inserting the side member and an undersize results in that either the shoulder formed between main and anchoring portion can only support itself on the side member on a part of its length and of two walls of the anchoring portion located opposite each other only one can be screwed to an inner surface of the side member through frictional connection or that the side member is deformed during the attempt of offsetting the undersize of the anchoring portion.

In order to solve this problem, a crashbox was developed, wherein an anchoring portion comprises two elements that are U-shaped or channel-shaped in cross section, which are interconnected only via the main portion. This produces the possibility of spreading the walls of the anchoring portion located opposite each other apart when fixing it to the side member by screwing so that both walls of the anchoring portion thus pressing both walls of the anchoring portion tightly against the insides of the side member without bending the latter in the process.

Tests have shown that the walls of the anchoring portion of this crashbox during a collision have a tendency of spreading apart scissor-like and in the process, expand the side member distant from its open end. Like any repair on the side member, rectifying such an expansion, provided it is at all economical, is labor-intensive and expensive.

Accordingly, it is desirable to provide a motor vehicle with an improved crashbox, wherein the tendency of a side member to be negatively affected during a collision is further reduced. In addition, other objects, desirable features and characteristics will become apparent from the subsequent summary and detailed description, and the appended claims, taken in conjunction with the accompanying drawings and this background.

SUMMARY

According to various exemplary embodiments of the present disclosure, a motor vehicle is provided having a side member, a bumper and a crashbox, which comprises a main portion extending between a tip of the side member and the bumper and an anchoring portion pushed into an open end of the side member, with a support body arranged within the anchoring portion and extending between walls of the anchoring portion located opposite each other.

Surprisingly, such a support body primarily only preventing the approximation of the walls of the anchoring portion located opposite each other to each other also proves effective in order to avoid or at least restrict the scissor-like expanding of the channel-shaped elements in the case of a collision with a crashbox having two channel-shaped elements which do not touch each other in the anchoring portion.

Each of these channel-shaped elements extend substantially unitarily both over the main portion as well as over the anchoring portion.

A generally economical production of the crashbox is possible when the channel-shaped elements are each connected to one another via flanges marginally standing away in the main portion.

Each of the walls located opposite each other should be part of another one of the channel-shaped elements.

The support body can, like possibly also the channel-shaped elements, be simply and cost-effectively formed from a flat material cutting.

Generally, the support body comprises at least one centerpiece oriented transversely to the side member and flanges angled off the at least one centerpiece and bearing against the walls of the anchoring portion located opposite each other.

In one example, the flanges are angled-off from the centerpiece towards an open end of the anchoring portion facing away from the bumper, in order to make possible a fastening of the flanges to the walls of the anchoring portion with the help of a tool introduced via the open end.

In order to be able to offset manufacturing tolerances of the crashbox, the support body should practically comprise an offsetting portion, which in a direction that is perpendicular to the walls located opposite each other is deformable to a limited extent.

Such an offsetting portion can in one example, comprise two flanges located opposite each other, each of which is connected to the centerpiece along one of its margins. Such an offsetting portion is deformable in a direction that is perpendicular to the walls located opposite each other and to the flanges, for as long as the flanges do not touch each other on their first margins, and a limit of the deformability is reached as soon as the flanges start to areally touch each other and support themselves on each other.

The flanges can be unitarily connected along a second margin via a U-shaped bend. Such a connection among the flanges facilitates the subsequent insertion of the support body when the channel-shaped elements of the crashbox have already been joined.

Alternatively, in another exemplary embodiment, the flanges can also be un-connected among themselves; this is practical in one example, when the support body comprises two parts, each of which is fastened, and generally prior to the connecting of the channel-shaped elements to one another, to one of the channel-shaped elements.

A center plane, in which the channel-shaped elements are interconnected, generally extends between the flanges of the offsetting portion located opposite one another.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
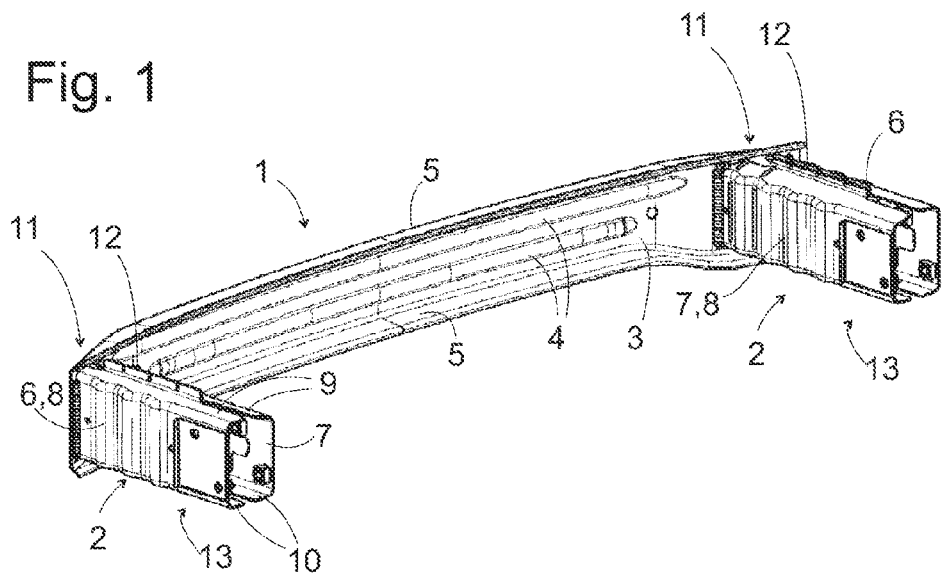
FIG. 1 a perspective view of a bumper with two crashboxes according to an exemplary embodiment of the present disclosure.

In a perspective view from the vehicle interior, FIG. 1 shows a bumper 1 of a motor vehicle, in one example, of a passenger motorcar having two crashboxes 2 fastened to its inside. The bumper 1 in this case is a simple single-walled steel profile of substantially C-shaped cross section with a front plate 3, which is stiffened through two beads 4 stamped in a vehicle transverse direction between the crashboxes 2, and with flanks 5 horizontally angled-off towards the vehicle interior from the upper and lower margin of the front plate 3. The crashboxes 2 engage from the vehicle inside into the hollow space delimited by the front plate 3 and the flanks 5 on the inside of the bumper 1 where they are welded.

The crashboxes 2 in turn each comprise two in this case substantially channel-shaped elements which like the bumper 1 are formed from sheet steel and of which one each arranged towards the vehicle outside is designated 6 and one arranged towards the vehicle center is designated 7. The channel-shaped elements 6, 7 each have a large-area vertical wall 8 shown in section in FIG. 2 and horizontal flanks 9, 10 angled off at their upper and lower margin. On a portion 11 facing the bumper 1 (see FIG. 1), in the following also called main portion, of the crashbox 2, strip-shaped flanges 12 are angled off upwards and downwards on the margins of the horizontal flanks 9, 10 of the elements 6, 7 facing each other. The surfaces of the upper and lower flanges 12 of the elements 6, 7 touching each other are located in a same vertical plane, which is designated 30 in FIG. 2. In a portion of the crashboxes 2 facing away from the bumper 1, designated anchoring portion 13, the flanges 12 are missing.

Figure 2:
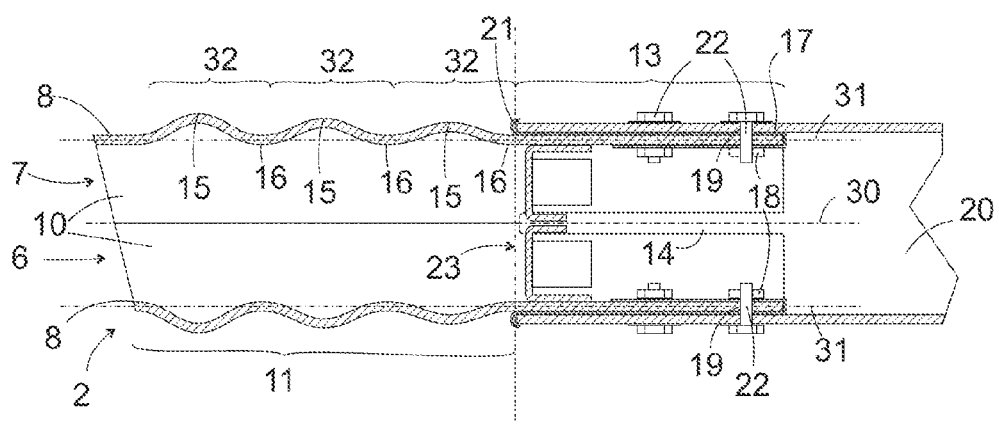
FIG. 2 a schematic longitudinal section through one of the crashboxes and a front end portion of a side member receiving the anchoring portion of the crashbox.
Figure 3:
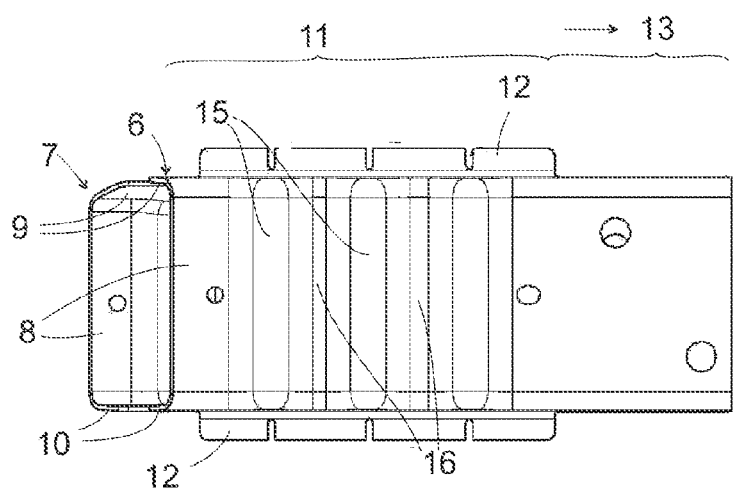
FIG. 3 a lateral view of the crashbox from FIG. 2.

FIG. 2 shows a longitudinal section through one of the crashboxes 2 along a horizontal section plane crossing the vertical walls 8 of both elements 6, 7. In the anchoring portion 13, the vertical walls 8 run in a straight line and parallel to the plane 30 in two planes each designated 31. In the main portion 11, the walls 8 are wavy in longitudinal section. FIG. 2 shows three complete waves 32 on each wall 8. It is obvious that the number of the waves can also be greater or smaller or that the element 7 located inside, since it is longer than the element 6 located outside, and can have more waves than the latter.

Wave troughs 16 of the waves 32 each are located in the plane 31, and wave peaks 15 are deflected out of the plane 31 towards a side facing away from the plane 30, namely the more, the further away they are from the anchoring portion 13. The amplitude of the waves 32 increasing towards the bumper 1 has as consequence that the deformation resistance of the waves 32 decreases from the anchoring portion 13 towards the bumper 1. Under the loading of an impact the wave 32 next adjacent to the bumper 1 therefore yields initially, than the one following this and so on. A relatively high collision speed is therefore required in order to achieve a deformation also in the rear region of the crashbox. As a consequence of this, the probability is relatively high that during an impact event the side member remains undamaged and a repair with moderate expenditure is possible.

In the anchoring portion 13, the horizontal flanks 9, 10 are narrower than in the main portion 11, so that the flanges 12 that are welded together are missing here and instead the edges of the horizontal flanks 9, 10 of both elements 6, 7 facing one another are separated by a gap 14, which extends over the entire length of the anchoring portion 13.

A curved element 17 in the shape of a hair pin of thin-walled sheet metal each is fitted onto the vertical walls 8 in the anchoring portion 13, on which in each case two nuts 18 are fastened aligned with bores 19 of the walls 8 as well as of side walls of a side member 20 receiving the anchoring portion 13. The stop of an angled-off marginal portion 21 of the hair pin-shaped element 17 on a front edge of the side member 20 marks a position in which the bores 19 of the anchoring portion 13 and of the side member 20 are aligned with each other, so that screws 22 can be screwed into the nuts 18 through them. By tightening these screws 22, the vertical walls 8 of both elements 6, 7, if required subject to a minor expansion of the gap 14, are tightly pressed against the inner surfaces of the side member 20.

Figure 4:
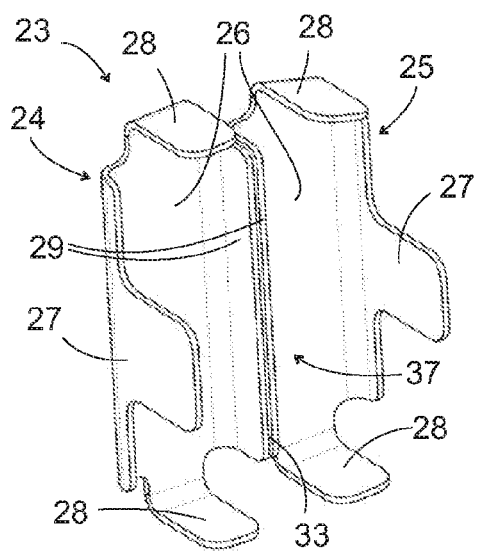
FIG. 4 a perspective view of a support body according to a first exemplary embodiment of the present disclosure.
Figure 5:
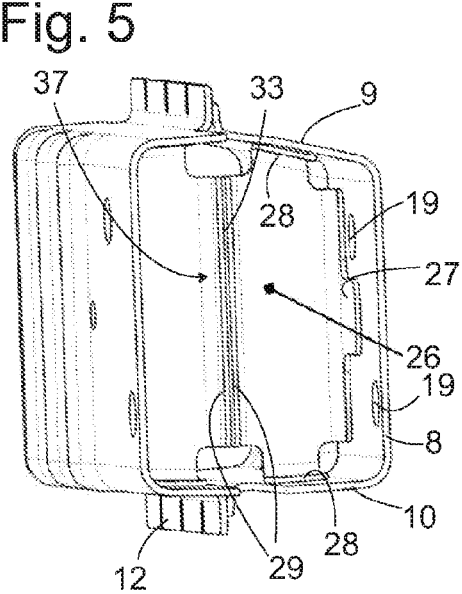
FIG. 5 a perspective view of the crashbox with the support body of FIG. 4 mounted in its interior.

In the interior of the anchoring portion 13, a two-part support body 23 is attached and, as is evident in the perspective view of FIG. 4, the support body 23 comprises two shaped parts 24, 25 which are in mirror image to each other which can be formed from the same steel plate as the channel-shaped elements 6, 7. Each shaped part 24, 25 comprises a substantially flat centerpiece 26 oriented transversely to the insertion direction of the anchoring portion 13 in the side member 20 and flanges 27, 28, 29 angled-off from the four margins of the centerpiece 26. The flanges 27 are each cut T-shaped, wherein the transverse beam of the T adjoins the centerpiece 26 and the foot of the T, as is shown in FIG. 5, areally bears against the vertical wall 8 of the element 6 or 7 between the bores 19 receiving the screws 22. The flanges 28 bear against the horizontal flanks 9, 10 of the elements 6, 7 in the same manner.

The flanges 27, 28 can be welded to the insides of the channel-shaped elements 6, 7 before the latter are interconnected along the flanges 12 in order to form the crashbox 2. However, it is also possible to first join the channel-shaped elements 6, 7 and then introduce the shaped parts 24, 25 into the anchoring portion 13 via the open end of the crashbox 2 facing away from the bumper 1. Since the flanges 27, 28 face the open end it is not difficult to fasten these in the anchoring portion 13 through spot welding in that a jaw of welding tongues used for this purpose is introduced into the open end of the anchoring portion 13.

The flanges 29 of the two shaped parts 24, 25 are located opposite each other subject to the formation of a narrow gap 33. The width of the gap 33 is selected so that taking into account manufacturing tolerances of the channel-shaped elements 6, 7 and of the shaped parts 24, 25, the shaped parts 24, 25 can be securely accommodated between the walls 8 of the elements 6, 7 located opposite each other; in practice, a width of the gap 33 of few millimeters is sufficient. In that during an impact event the flanges 29 collide, they limit the extent to which the crashbox 2 can narrow at the foot of the anchoring portion 13 and as a consequence also the extent of the possible spreading open of the ends of the channel-shaped elements 6, 7 facing away from the bumper 1. Thus the risk of a deformation of the end region of the side member 20 receiving the anchoring portion 13 is likewise reduced in the event of a collision.

Figure 6:
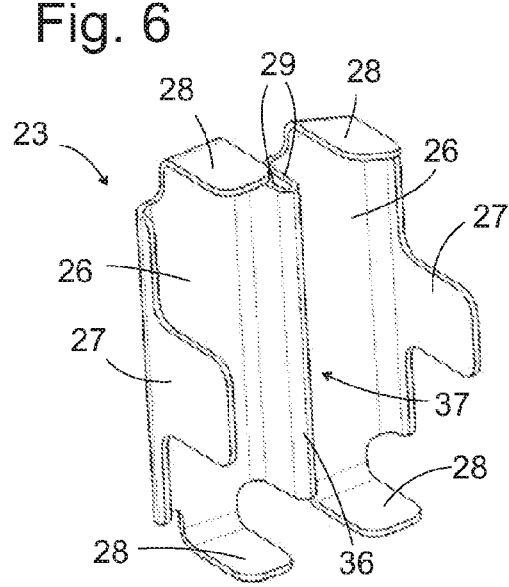
FIG. 6 a perspective view of a support body according to another exemplary embodiment of the present disclosure.
Figure 7:
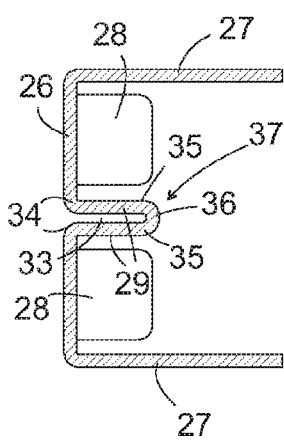
FIG. 7 a schematic cross section of the support body of FIG. 6.

FIGS. 6 and 7 show another exemplary embodiment of the support body 23 in a perspective view that is analogue to FIG. 6 or in a cross section along the same section plane as in FIG. 2. Shape and dimensions of the centerpieces 26 and flanges 27, 28 are the same as shown in FIG. 4, and a difference merely is that the flanges 29 located opposite each other and connected to the centerpieces 26 in each case via a margin 34 bent approximately at a right angle are unitarily connected through a U-bend 36 on the margins 35 located opposite the margins 34. The one-piece construction of the support body 23 ensures that the centerpieces 26 are located in a same plane on both sides of the gap 33 and can effectively limit the narrowing of the anchoring portion 13 in the event of an impact event by colliding with each other. Conversely, the U-bend 36 can be slightly widened in order to make possible an areal contact of the flanges 27 on both vertical walls 8 when manufacturing tolerances of the anchoring portion 13 or of the support body 23 make this necessary.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle, comprising:
   a side member;
   a bumper; and
   a crashbox including:
      a main portion extending between a tip of the side member and the bumper;
      an anchoring portion pushed into an open end of the side member; and
      a support body that extends within the anchoring portion between walls of the anchoring portion located opposite each other, the support body comprising:
         at least one centerpiece aligned transversely to the side member; and
         a plurality of flanges angled off the at least one centerpiece, the plurality of flanges bearing against the walls located opposite each other;
      wherein the support body further comprises an offsetting portion, wherein the offsetting portion is deformable to a limited degree in a direction that is perpendicular to the walls located opposite each other.

2. The motor vehicle according to claim 1, wherein the crashbox further comprises two channel-shaped elements which do not touch one another in the anchoring portion.

3. The motor vehicle according to claim 2, wherein each of the two channel-shaped elements are connected to each other via a second plurality of flanges marginally standing away in the main portion.

4. The motor vehicle according to claim 3, wherein the walls of the anchoring portion comprise two parallel vertical walls, and wherein one of the two channel-shaped elements comprises a first one of the two parallel vertical walls, and a second one of the two channel-shaped elements comprises a second one of the two parallel vertical walls located opposite the first one of the two parallel vertical walls.

5. A motor vehicle with a side member, a bumper and a crashbox, the crashbox comprising:
   a main portion extending between a tip of the side member and the bumper;
   an anchoring portion pushed into an open end of the side member; and
   a support body that extends within the anchoring portion between walls of the anchoring portion located opposite each other, the support body comprising:
      at least one centerpiece aligned transversely to the side member; and
      a plurality of flanges angled off the at least one centerpiece, the plurality of flanges bearing against the walls located opposite each other;
   wherein the support body further comprises an offsetting portion, wherein the offsetting portion is deformable to a limited degree in a direction that is perpendicular to the walls located opposite each other.

6. The crashbox according to claim 5, further comprising two channel-shaped elements which do not touch one another in the anchoring portion.

7. The crashbox according to claim 6, wherein the channel-shaped elements each extend unitarily over the main portion and the anchoring portion.

8. The crashbox according to claim 7, wherein the channel-shaped elements are connected to each other via a second plurality of flanges marginally standing away in the main portion.

9. The crashbox according to claim 7, wherein the walls comprise two parallel vertical walls, and wherein one of the channel-shaped elements comprises a first one of the two parallel vertical walls located opposite a second one of the two parallel vertical walls.

10. The crashbox according to claim 5, wherein the support body is formed from at least one flat material cutting.

11. The crashbox according to claim 5, wherein the plurality of flanges are angled off from the centerpiece towards an open end of the anchoring portion facing away from the bumper.

12. The crashbox according to claim 5, wherein the offsetting portion further comprises a first flange and a second flange, wherein the first flange is located opposite the second flange, and wherein the first flange is connected to the centerpiece along a first margin and the second flange is connected to the centerpiece along a second margin.

13. The crashbox according to claim 12, wherein the plurality of flanges are unitarily connected via a substantially U-bend along a third margin.

14. The crashbox according to claim 12, wherein the first flange is not connected to the second flange.

15. The crashbox according to claim 12, wherein the crashbox further comprises two channel-shaped elements which do not touch one another in the anchoring portion; and
  wherein a center plane, in which the channel-shaped elements are connected, extends between a subset of the plurality of flanges, wherein the subset comprises flanges of the offsetting portion located opposite one another.

* * * * *